United States Patent
Kumar et al.

(10) Patent No.: US 7,967,215 B2
(45) Date of Patent: Jun. 28, 2011

(54) SYSTEMS, METHODS, AND COMPUTER PROGRAM PRODUCTS FOR SUPPORTING MULTIPLE CONTACTLESS APPLICATIONS USING DIFFERENT SECURITY KEYS

(75) Inventors: Pradeep Kumar, Fremont, CA (US); Ming-Li Liu, Foster City, CA (US); Roshan Vijayshankar, Santa Clara, CA (US); Philippe Martin, San Jose, CA (US)

(73) Assignee: Vivotech Inc., Santa Clara, CA (US)

( * ) Notice: Subject to any disclaimer, the term of this patent is extended or adjusted under 35 U.S.C. 154(b) by 452 days.

(21) Appl. No.: 12/105,778

(22) Filed: Apr. 18, 2008

(65) Prior Publication Data

US 2009/0261172 A1    Oct. 22, 2009

(51) Int. Cl.
    *G06K 19/06*    (2006.01)
(52) U.S. Cl. .................... 235/492; 235/380; 235/487
(58) Field of Classification Search .................. 235/492, 235/380, 487, 451
    See application file for complete search history.

(56) References Cited

U.S. PATENT DOCUMENTS

| | | | |
|---|---|---|---|
| 6,549,912 B1 | 4/2003 | Chen | |
| 2004/0140351 A1* | 7/2004 | Flugge et al. | 235/382 |
| 2004/0146163 A1 | 7/2004 | Asokan et al. | |
| 2005/0086497 A1 | 4/2005 | Nakayama | |
| 2007/0136576 A1 | 6/2007 | Chambers et al. | |

FOREIGN PATENT DOCUMENTS

| | | |
|---|---|---|
| EP | 1 760 671 A1 | 3/2007 |
| WO | WO 2009/129535 A2 | 10/2009 |

OTHER PUBLICATIONS

Leiwo, "Cryptographic protocols, Lecture 2: Challenge—Response protocols for identification," pp. 1-9 (Jun. 16, 2003).
"MF1 IC S50 Functional specification," Rev. 5.2, pp. 1-17 (Jan. 15, 2007).
Meyn, "ISO/IEC FCD 14443-4 Identification cards—Contactless integrated circuit(s) cards—Proximity cards—Part 4: Transmission protocol," Version 3.3, pp. 1-39 (Mar. 10, 2003).
"Introduction to NFC (Near Field Communication)," 16th IST Mobile & Wireless Communications Summit, pp. 1-34 (Jul. 2007).

(Continued)

*Primary Examiner* — Edwyn Labaze
(74) *Attorney, Agent, or Firm* — Jenkins, Wilson, Taylor & Hunt, P.A.

(57) ABSTRACT

Systems, methods, and computer program products for supporting multiple contactless applications using different security keys on a wireless smart device are disclosed. According to one aspect, the subject matter described herein includes a method for supporting multiple contactless applications using different security keys on a wireless smart device. The method includes, at a wireless smart device configured to communicate with a wireless smart device reader, the wireless device including a plurality of contactless applications and a contactless application memory for use by the plurality of contactless applications, initializing a portion of the memory such that access to the portion of memory requires the use of a shared secret key known to the plurality of contactless applications. The method includes reserving the portion of memory for use by one of the plurality of contactless applications by using the shared secret key to set access privileges for the portion of memory such that access to the portion of memory requires the use of a application-specific secret key associated with the one application and not known to the other applications.

18 Claims, 7 Drawing Sheets

OTHER PUBLICATIONS

"AN MAD MIFARE application directory," Rev. 03.00, pp. 1-22 (May 4, 2007).

"MF3ICD8101 MIFARE DESFire contactless multi-application IC BL-ID Doc. No. 145610," Rev. 01-00, pp. 1-12 (Dec. 11, 2007).

"Mifare Interface Platform Type Identification Procedure," Revision 1.3, pp. 1-25 (Nov. 2004).

"Mifare Ultralight Contactless Single-trip Ticket IC MFO IC U1 Functional Specification," Revision 3.0, pp. 1-22 (Mar. 2003).

"Mobile Payment Forum Overview of Mobile Proximity Payment Issues and Recommendations," pp. 1-22 (Jan. 16, 2007).

"ANO2105 Secure Access to MIFARE Memory on Dual Interface Smart Card ICs," Revision 1.2, pp. 1-11 (Sep. 6, 2002).

Notification of Transmittal of the International Search Report and the Written Opinion of the International Searching Authority, or the Declaration for International Application No. PCT/US2009/041139 (Nov. 27, 2009).

* cited by examiner

```
┌─────────────────────────────────────────────┐
│ AT A WIRELESS SMART DEVICE CONFIGURED TO    │
│ COMMUNICATE WITH A WIRELESS SMART DEVICE    │──── 400
│ READER, THE DEVICE INCLUDING A SECURE       │
│ ELEMENT FOR HOSTING A PLURALITY OF          │
│ CONTACTLESS APPLICATIONS BASED ON MIFARE    │
│ SPECIFICATIONS AND A MIFARE MEMORY FOR USE  │
│ BY THE PLURALITY OF CONTACTLESS             │
│ APPLICATIONS BASED ON MIFARE SPECIFICATIONS,│
│ INITIALIZE A SECTOR OF THE MIFARE MEMORY    │
│ SUCH THAT A SECTOR TRAILER OF THE SECTOR    │
│ CONTAINS A SHARED SECRET KEY KNOWN TO THE   │
│ PLURALITY OF CONTACTLESS APPLICATIONS BASED │
│ ON MIFARE SPECIFICATIONS HOSTED BY THE      │
│ SECURE ELEMENT                              │
└─────────────────────────────────────────────┘
                        ↓
┌─────────────────────────────────────────────┐
│ RESERVE THE SECTOR OF MIFARE MEMORY FOR USE │──── 402
│ BY ONE OF THE PLURALITY OF CONTACTLESS      │
│ APPLICATIONS BASED ON MIFARE SPECIFICATIONS │
│ BY USING THE SHARED SECRET KEY TO WRITE     │
│ INFORMATION ASSOCIATED WITH THE ONE         │
│ APPLICATION INTO THE MIFARE MEMORY,         │
│ INCLUDING WRITING AN APPLICATION-SPECIFIC   │
│ SECRET KEY ASSOCIATED WITH THE ONE          │
│ APPLICATION INTO A KEY FIELD OF THE SECTOR  │
│ TRAILER                                     │
└─────────────────────────────────────────────┘
                        ↓
┌─────────────────────────────────────────────┐
│ PERFORM A MIFARE TRANSACTION WITH THE       │──── 404
│ WIRELESS SMART DEVICE READER, THE MIFARE    │
│ TRANSACTION INCLUDING ACCESSING, BY THE     │
│ WIRELESS SMART DEVICE READER, THE RESERVED  │
│ SECTOR OF MIFARE MEMORY USING THE           │
│ APPLICATION-SPECIFIC SECRET KEY CONTAINED   │
│ IN THE KEY FIELD OF THE SECTOR TRAILER      │
└─────────────────────────────────────────────┘
                        ↓
┌─────────────────────────────────────────────┐
│ RELEASE THE SECTOR OF MIFARE MEMORY FOR USE │──── 406
│ BY ANOTHER OF THE PLURALITY OF CONTACTLESS  │
│ APPLICATIONS BASED ON MIFARE SPECIFICATIONS │
│ BY USING THE APPLICATION-SPECIFIC SECRET    │
│ KEY ASSOCIATED WITH THE ONE APPLICATION TO  │
│ WRITE THE SHARED SECRET KEY INTO A KEY      │
│ FIELD OF THE SECTOR TRAILER                 │
└─────────────────────────────────────────────┘
```

FIG. 4

SYSTEMS, METHODS, AND COMPUTER PROGRAM PRODUCTS FOR SUPPORTING MULTIPLE CONTACTLESS APPLICATIONS USING DIFFERENT SECURITY KEYS

TECHNICAL FIELD

The subject matter described herein relates to methods and systems for interacting with a wireless smart device. More particularly, the subject matter described herein relates to systems, methods, process, and computer program products for supporting multiple contactless applications using different security keys.

BACKGROUND

With the success and widespread prevalence of the use of credit and debit cards for banking transactions, card issuers, such as banks and financial institutions, have turned to wireless smart devices as a means to provide their customers with a richer, more powerful set of features than is possible using a traditional magnetic stripe ("magstripe") credit card.

As used herein, the term "smart device" refers to a device with processing capabilities. A smart device may have on-board memory, add-on memory or other storage capacity, may be written to as well as read from, and may contain one or more applications that perform a particular function or functions. Some smart devices may contain an operating system and/or user interface.

As used herein, the term "wireless smart device" refers to a smart device that can communicate via an electric and/or magnetic field between the device and some other entity, usually a wireless terminal or reader. For example, a proximity integrated circuit card (PICC) may communicate wirelessly with a proximity coupling device (PCD) to perform banking transactions similar to those performed by a traditional magstripe credit card.

One type of wireless communications that can be used between a wireless smart device and reader is near field communication (NFC). In one form of near field communication, a wireless smart device may communicate with a reader via inductive coupling of the reader antenna to the device antenna. The two loop antennas effectively form a transformer. The reader amplitude-modulates the RF field to send information to the device. The device communicates with the reader by modulating the loading on the device antenna, which also modulates the load on the reader antenna.

An example of near-field wireless communications standard commonly used by wireless smart devices is ISO 14443. The International Organization for Standardization/International Electrotechnical Commission (ISO/IEC) 14443 specification (hereinafter referred to as the "ISO 14443") defines a communications protocol for wireless smart devices operating at 13.56 MHz in close proximity with a reader antenna. ISO 14443 consists of four parts, hereinafter referred to as 14443-1, 14443-2, 14443-3, and 14443-4. ISO 14443-1 and 14443-2 define the physical characteristics of PICCs and the methods for wireless power and data transfer between PCDs and PICCS. ISO 14443-3 defines initialization and anti-collision protocols for PICCs and PCDs. ISO 14443-4 defines the high-level data transmission protocols used by PICCs and PCDs.

As used herein, the term "application" refers to a program, function, routine, applet, or similar entity that is hosted by (i.e., exists on and performs its operations on) a wireless smart device. An application may be implemented in hardware, software, firmware, or any combination thereof. One type of application that may exist on a wireless smart device is a contactless application based on MIFARE® specifications. MIFARE® is a standard that defines protocols and memory storage format for applications on wireless smart devices. MIFARE® is a leading industry standard for contactless smart card transactions, with a very large installed base worldwide. The MIFARE® standard can support a wide range of applications such as contactless payment, loyalty, public transportation, ticketing, coupon, access control, and gaming. Successful deployments of MIFARE® technology include the Oyster® card used in London, Touch 'n Go used in Malaysia, and the Breeze card used in Atlanta. However, these deployments are localized and are not interoperable with each other.

As used herein, the term "MIFARE® application" refers to an application that complies with MIFARE® specifications. The MIFARE® wireless smart card standard is a proprietary technology based on the ISO 14443 Type A specification. A first category of MIFARE® products includes MIFARE® Classic and MIFARE® UltraLight which support ISO 14443-1, 14443-2, and 14443-3, but replace ISO 14443-4 with MIFARE® proprietary protocol. Additionally, MIFARE® Classic products support a proprietary security protocol for authentication. A second category of MIFARE® products includes MIFARE® ProX and MIFARE® SmartMX wireless smart devices and readers that supports all four parts of ISO 14443 and can also support MIFARE® proprietary protocol. MIFARE® applications may include, for example, electronic coupons or customer loyalty cards.

FIG. 1 is a block diagram illustrating the organization of memory on one type of a conventional MIFARE® card, called a MIFARE® 1K card, so named because it includes 1K (i.e., 1,024 bytes) of MIFARE® memory. Other types of MIFARE® cards may include larger or smaller amounts of memory, depending on how the card will be used, i.e., its intended purpose. For example, a gift card that only stores the current balance of the gift amount may need less memory space than a customer loyalty card that stores a large amount of information about the customer, such as identification information, account numbers, shopping history, shopping preferences, and so on. In this example, the MIFARE® 1K memory is a 1,024-byte electrically erasable programmable read-only memory (EEPROM) memory 100, which is divided into 16 sectors. Each sector 102 contains 4 blocks, and each block 104 contains 16 bytes. The last block of each MIFARE® memory sector is called the sector trailer 106, and contains two secret keys, key A 108 and key B 110, as well as programmable access bits 112 that control access conditions for the sector. For example, access bits 112 may be set such that authentication with key A 108 is required before the sector can be read but authentication with key B 110 is required before the sector can be written. Key A 108 and key B 110 are referred to as "secret" keys because their contents are unreadable; if an application attempts to read a sector's sector trailer 106, the values of access bits 112 will be correctly returned, but the values of key A 108 (and key B 110, unless this field is used for data storage instead of key storage) will always return all zeros. This prevents malicious or accidental circumvention of the security mechanism, by keeping secret the value of the keys needed to access the sector. For example, a reader having only read access to a sector cannot use its "read" key to read sector trailer 106 and determine the "write" key.

Conceptually, a MIFARE® application may be thought of as an agreement between the reader and the card or device that is hosting the application as to the contents of the MIFARE® memory—i.e., an agreement about what data will be stored in which sectors, what kinds of operations the reader will be allowed to perform on each sector, and the keys that the reader will need to perform the allowed operations. For example, a MIFARE® application may use one sector to store information typically contained on a magstripe card, such as account number, expiration date, cardholder name, etc., and another sector to keep track of credits earned, bonus points accumulated, and so on. In another example, a sector may be used to store the current balance of a prepaid account, a gift card, or similar, in which case the application may deduct an amount from the balance as the account holder makes purchases. A MIFARE® application may use as few or as many sectors as it needs, limited only by the number of sectors available on the device. Using the memory illustrated in FIG. 1, a MIFARE® application may use from 1 to 16 sectors. Thus, the fundamental difference between one MIFARE® application and another MIFARE® application, for example, may lie merely in how each application uses the MIFARE® memory space.

MIFARE® memory is organized such that each sector has its own set of secret keys and access bits. Each sector's secret keys may be distinct from the secret keys used by other sectors, but this is not required. Each sector's access bits 112 can also be set independently of other sectors. The value of the access bits 112 determine the read/write characteristics of the sector and also determine which key is required for each operation. Since each sector has its own set of access bits, a MIFARE® application may maintain data with different access restrictions. For example, some sectors may be configured as read-only sectors, while other sectors may be configured as read-write sectors. Read-only sectors may be used to store static data, such as credit card number, coupon code, ticket number and/or account holder name, while read-write sectors may be used to store account balances for prepaid accounts or gift cards, or uses status for coupon, ticket and/or promotions, for example. Because access to MIFARE® memory sectors always requires the use of an access key, MIFARE® sectors may be thought of as never being unlocked. This characteristic of MIFARE® memory architecture is a principle obstacle to sharing MIFARE® memory among multiple MIFARE® applications.

Conventionally, there have been two different approaches to sharing memory between applications. The first is a territorial approach, which is to strike an agreement between the applications regarding which portions of memory will be "owned"—i.e., exclusively used—by each application. Using a MIFARE® example, application A may own sectors 0 through 3, application B may own sectors 4 through 9, application C may own sectors 10 and 11, and so on. However, the territorial approach is impractical for a number of reasons. First, some applications may conform to a standard which has severe constraints on memory space. For example, some MIFARE® products have extremely limited memory space (e.g., as little as 320 Bytes), so there may not be enough sectors to allocate out to the multiple applications and still allow each application to have enough memory space for its needs. Second, some applications may conform to a standard which does not contemplate or accommodate the concept of sharing memory space with other applications. For example, each MIFARE® application typically expects to have the entire MIFARE® memory space available to use as it pleases, and providers of MIFARE® applications are generally free to change the number, allocation, or selection of sectors used without notice. Sharing memory in a non-overlapping way would require that the application providers negotiate between themselves to allocate the use of specific sectors to one application or the other. Due to the limited memory space available on a typical MIFARE® card and the large number of possible combinations of applications that might be loaded together on a single MIFARE® device, this approach is impractical.

The second approach is a cooperative sharing approach in which the applications take turns using the entire memory and where by agreement among the application providers only one application at a time has use of that entire memory. In the cooperative sharing approach, all the applications either use the same secret keys or know each other's secret keys. However, this approach has serious drawbacks. For security reasons, having all applications use the same secret key or key set is undesirable, because if that one key or key set is compromised, all applications are at risk of misuse, abuse, or fraud. Having each application know the other applications' secret keys is also undesirable because application providers do not want to share their security keys with other application providers, and because a single malicious application may then harvest all of the secret keys available on the device, for potentially nefarious purposes. In short, the weakness of the cooperative sharing approach is that it works only if all applications cooperate nicely.

For this reason, although MIFARE® memory is organized so that it is theoretically possible to support multiple applications, actually supporting multiple MIFARE® applications using different security keys on the same card is so impractical as to be essentially impossible using conventional methods. The difficulties of supporting multiple applications using different security keys on the same wireless smart device apply generally to any application standard, including the MIFARE® standard, in which all or some portion of application memory may be reserved or locked by one application for its exclusive use, particularly if locking or reserving the memory involves the use of an application-specific secret key. As in the MIFARE® case, security concerns may render unacceptable the territorial and cooperative sharing approaches described above.

Accordingly, there exists a need for methods, systems, and computer program products for supporting multiple contactless applications using different security keys on the same wireless smart device.

SUMMARY

According to one aspect, the subject matter described herein includes a method for supporting multiple contactless applications using different security keys on a wireless smart device. The method includes, at a wireless smart device configured to communicate with a wireless smart device reader, the wireless device including a plurality of contactless applications and a contactless application memory for use by the plurality of contactless applications, initializing a portion of the memory such that access to the portion of memory requires the use of a shared secret key known to the plurality of contactless applications. The method includes reserving the portion of memory for use by one of the plurality of contactless applications by using the shared secret key to set access privileges for the portion of memory such that access to the portion of memory requires the use of an application-specific secret key associated with the one application and not known to the other applications.

According to another aspect, the subject matter described herein includes a method for supporting multiple contactless applications based on MIFARE® specifications using different security keys on a wireless smart device. The method includes, at a wireless smart device configured to communicate with a wireless smart device reader, the device including a secure element for hosting a plurality of contactless applications based on MIFARE® specifications and a MIFARE® memory for use by the plurality of contactless applications based on MIFARE® specifications, initializing a sector of the MIFARE® memory such that a sector trailer of the sector contains a shared secret key known to the plurality of contactless applications based on MIFARE® specifications hosted by the secure element. The method includes reserving the sector of MIFARE® memory for use by one of the plurality of contactless applications based on MIFARE® specifications by using the shared secret key to write information associated with the one application into the MIFARE® memory, including writing an application-specific secret key associated with the one application into a key field of the sector trailer.

According to yet another aspect, the subject matter described herein includes a wireless smart device for supporting multiple contactless applications using different security keys. The wireless smart device includes a communications module for wirelessly communicating with a wireless smart device reader, and a plurality of applications for communicating with the wireless smart device reader via the communications module, each application having associated with it an application key not known to the other applications. The wireless smart device also includes an application memory for use by the plurality of applications and accessible by the wireless smart device reader via the communications module, wherein access to at least a portion of the memory requires the use of an access key. The application memory is configured such that, upon initialization, a shared secret key, known to the plurality of applications, is the access key for the portion of memory. Each application is configured to reserve a portion of memory by using the shared secret key to change the access key for the portion to the application key associated with that application. Each application is also configured to release the reserved portion of memory by using the application key associated with that application to change the access key for the portion to shared secret key.

The subject matter described herein for supporting multiple contactless applications using different security keys may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer program product comprising computer executable instructions embodied in a computer readable medium.

Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which:

FIG. 4 is a flow chart illustrating an exemplary process for supporting multiple contactless applications based on MIFARE® specifications using different security keys on the same wireless smart device according to an embodiment of the subject matter described herein;

DETAILED DESCRIPTION

In accordance with the subject matter disclosed herein, systems, methods, and computer program products are provided for supporting multiple contactless applications, including MIFARE® applications, using different security keys. In contrast with conventional territorial or cooperative sharing approaches, a "secure sharing" approach as described herein allows multiple applications to share application memory without increased security risk to each application.

Figure 1:
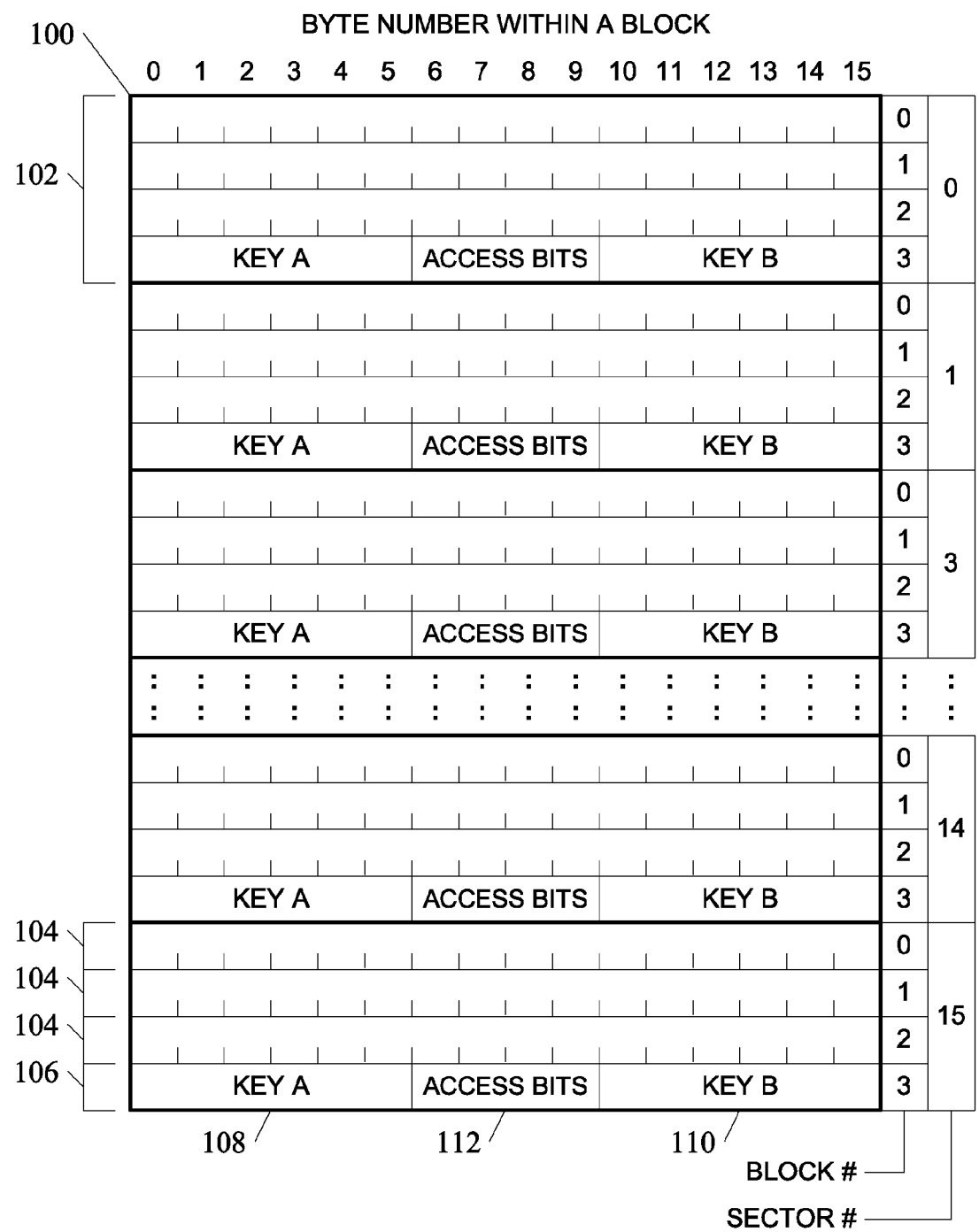
FIG. 1 is a block diagram illustrating the organization of memory on a conventional MIFARE® card.
Figure 2:
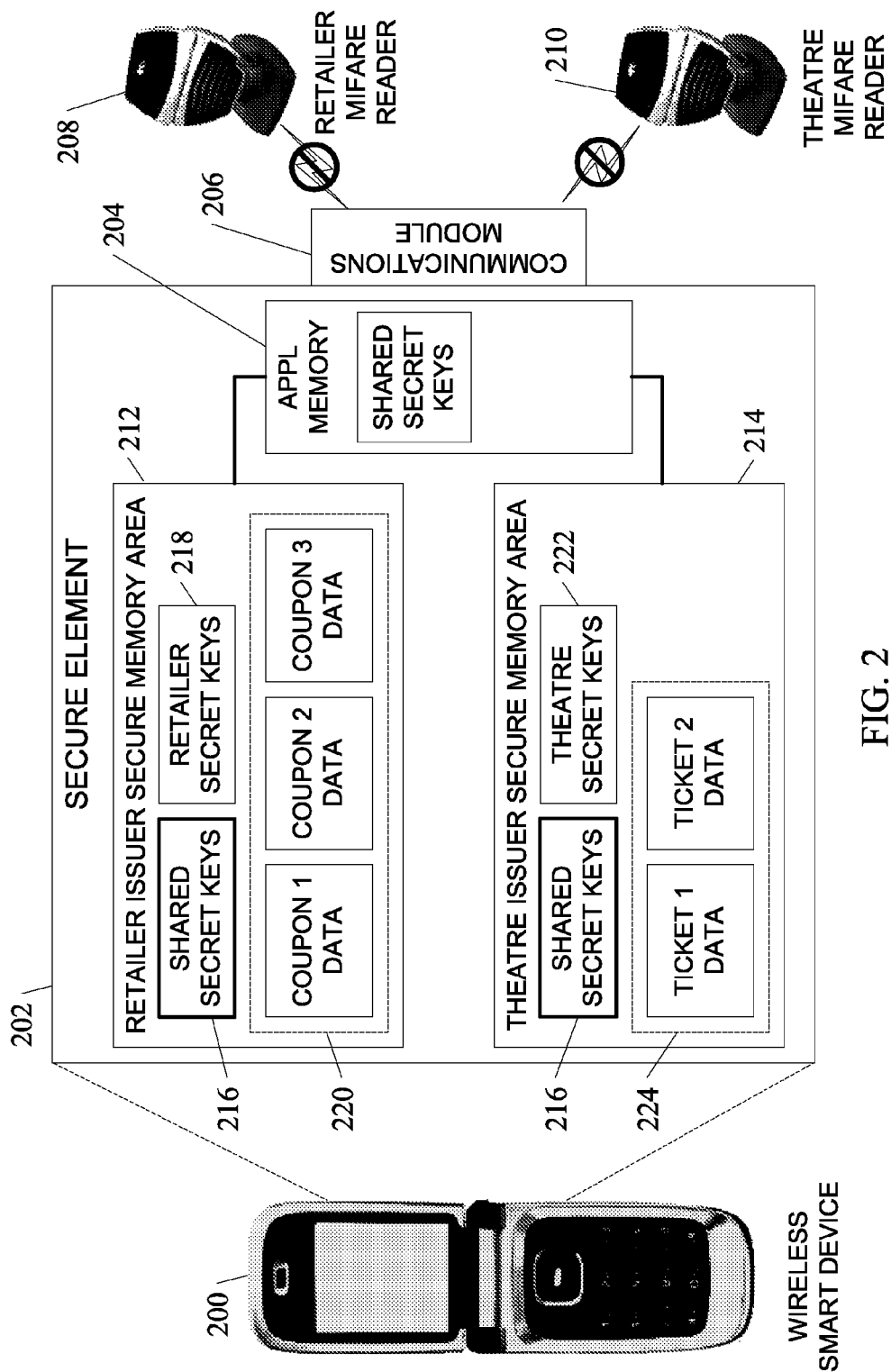
FIG. 2 is a block diagram illustrating an exemplary system for supporting multiple contactless applications using different security keys on the same wireless smart device according to an embodiment of the subject matter described herein.

FIG. 2 is a block diagram illustrating an exemplary system for supporting multiple contactless applications using different security keys on the same wireless smart device according to an embodiment of the subject matter described herein. Wireless smart device 200 may host multiple contactless applications. In one embodiment, device 200 may host multiple MIFARE® applications. Device 200 may host other types of contactless applications also, such as PayPass™ applications, Java Card applets, and others.

In one embodiment, device 200 may include a secure element 202 for hosting the multiple applications. One function of secure element 202 is to provide to each hosted application a private and secure workspace and to protect each application from unauthorized access of its data by another application. Secure element 202 may include an application memory 204 for use by the applications hosted by secure element 202. Some or all of application memory 204 may be reserved or locked for the exclusive use of a hosted application. In one embodiment, application memory 204 may be an emulated MIFARE® memory, shared by multiple MIFARE® applications. In such embodiments, each sector of MIFARE® memory may be locked for the exclusive use of a MIFARE® application by writing one or more of that application's secret keys into that sector's sector trailer 106. Device 200 may include a communications module 206 for communicating with wireless smart device readers, such as retailer reader 208 and theatre reader 210.

In the embodiment illustrated in FIG. 2, secure element 202 hosts two applications, a retailer application and a movie theatre application. Each application has its own secure memory section, secure memory areas SMA1 212 and SMA2 214, respectively. In this example, the retailer application manages coupons which may be used during purchases, and the theatre application manages electronic tickets. For clarity, the secure memory areas for the two applications (SMA1 212 and SMA2 214) are shown in FIG. 2, but the applications themselves are not shown.

Each application has access to set of shared secret keys 216, which are used to lock application memory 204 in order to allow applications hosted by secure element 202 to have subsequent access to application memory 204. The set of shared secret keys 216 may include only a single key or it may include multiple keys. In a MIFARE® memory, each sector 102 has a sector trailer 106. Thus, each sector may have its own unique secret key or keys, or the same pair of keys may be used for all sectors. Other numbers of keys per sector are contemplated, as well as other combinations of key attributes, such as shared among sectors/unique per each sector. For example, each sector may have its own unique write key while all sectors use the same read key.

In one embodiment, the set of shared secret keys 216 is unique to each device 200 or secure element 202. Shared secret keys 216 are known only to the applications hosted by secure element 202; in a typical embodiment, the contents of shared secret keys 216 cannot be determined by retailer reader 208. Values for shared secret keys 216 may be chosen so as to avoid values known to be in use by applications and readers, to prevent the possibility of access to application memory 204 while in its supposedly locked state.

In one embodiment, sharing of application memory 204 among multiple applications using different security keys involves three distinct steps: initialization, reservation, and release. Each of these will be discussed in turn.

Initialization of application memory 204 refers to the process whereby application memory 204 is placed into a locked state that requires the use of shared secret keys 216 to unlock. Initialization of application memory 204 may occur, for example, during device power-on or device reset, memory reset, via administrative function, and the like. Application memory 204 may be initialized to this locked state by operation of hardware, firmware, software, or a combination of the above. In the embodiment illustrated in FIG. 2, application memory 204 has been locked such that access to application memory 204 requires the use of shared secret keys 216, thus preventing access to application memory 204 by either retailer reader 208 or theatre reader 210. In a MIFARE® context, the MIFARE® memory may be initialized so that every sector trailer 106 contains the set of shared secret keys 216.

Reservation of application memory 204 refers to the process whereby one application gains access to the memory and locks (i.e., prevents other applications from gaining access to) some or all of the memory space. In one embodiment, during the reservation process, the current access key must be used to change the access permissions of the memory such that access to the memory requires the use of the new access key. In other words, the current key must be used to change the current key to the new key.

In a MIFARE® example, a MIFARE® application may reserve a sector of MIFARE® memory by using shared secret keys 216 to write its own secret application keys into the MIFARE® memory sector trailer 106. Once sector trailer 106 contains the first application's secret application keys, a second application will be unable to access the memory unless it, too, knows the first application's secret keys, and specifically, the secret key currently in sector trailer 106.

Release of application memory 204 refers to the process whereby application memory 204 is placed into a state in which the memory is not actively being used by an application and thus may be reserved for exclusive use by any qualified application, where an application is considered "qualified" if it has the means to reserve the memory for itself—e.g., it knows the necessary key.

In some embodiments, memory may be released but not unlocked: that is, accessing the memory may always require a key, but that key may or may not be known publicly. As described above, access to a MIFARE® memory always requires a key: conceptually, one can say that MIFARE® memory is always locked. In a MIFARE® context, "reserving" a memory means locking the memory with a key known only to the entity for whom the memory is reserved, and "releasing" a memory means locking the memory with a key known to other entities that may want to access the memory or reserve the memory for themselves. In one embodiment, all applications hosted by secure element 202 or otherwise existing on device 200 may, by convention or agreement, ensure that upon completion of the release process application memory 204 will be placed into the initialized state (e.g., the sector trailers will contain the shared secret keys 216) thus guaranteeing that applications hosted by secure element 202 will be able to subsequently reserve the memory for their exclusive use, or even merely access the memory without reserving it, if they so choose.

In one embodiment, each application keeps a copy of shared secret keys 216 in the application's secure memory area. In another embodiment, secure element 202 maintains a single copy of shared secret keys 216, which each application accesses when needed via a function call or other mechanism, at which time secure element 202 provides shared secret keys 216 to the application requesting them.

The contents of application memory 204 may be accessed by a wireless smart device reader via communication with and through communications module 206. From the perspective of a wireless smart device reader, the only memory that exists on device 200 is application memory 204. A wireless smart device reader accesses application memory 204 via sending messages containing one or more commands defined in a command set. In one embodiment, the commands sent by the wireless smart device reader must include or incorporate a correct access key. For example, a MIFARE® reader accesses a MIFARE® application memory 204 via MIFARE® commands. Two requirements must be met in order for a MIFARE® reader to access a MIFARE® application memory 204: first, the MIFARE® reader must use a valid sector key; and second, the sector's access permission settings must allow the attempted access.

In one embodiment, application memory 204 may be an emulated MIFARE® memory. For the remainder of the description of FIG. 2, the application memory 204 will, for the purpose of illustration only, and not for the purpose of limitation, be presumed to be a MIFARE® memory. In the MIFARE® context, a sector key used by retailer reader 208 is "valid" if it matches the sector key in the trailer block of the sector that retailer reader 208 is attempting to access. For example, if retailer reader 208 attempts to write to sector 11 of application memory 204, and the access bits 112 in sector 11 are set such that write access to sector 11 requires the use of key B 110 of sector 11, then if retailer reader 208 does not use a key with the same value as key B 110 of sector 11, retailer reader 208 will not be able to write data to sector 11. In embodiments which use an encryption algorithm that allows for multiple keys to be used, a valid key may be one that does not exactly match a key in sector trailer 106 but that allows access to the sector nonetheless.

On the other hand, applications hosted by device 200 may access application memory 204 via application programming interface (API) calls, which do not go to or through communications module 206. In one embodiment, only one requirement must be met in order for an application hosted by device 200 to access application memory 204: the application must use a valid access key. In a MIFARE® context, a MIFARE® application will be able to access a sector of the MIFARE® application memory 204 if the access keys used by the application match both key A 108 and key B 110 of that sector's sector trailer 106. In one embodiment, if the MIFARE® application uses the valid keyset, the MIFARE® application will be able to access the sector regardless of the contents of that sector's access bits 112.

In one embodiment, each application may use its secure memory area to store application-specific keys, data, or both. For example, the retailer application may store its retailer secret keys 218 and coupon data 220 in its secure memory area SMA1 212, while the theatre application may use its secure memory area SMA2 214 to store theatre secret keys 222 and ticket data 224. An example of the operation of secure element 202 and interaction between device 200 and retailer reader 208 will now be described.

Figure 3:
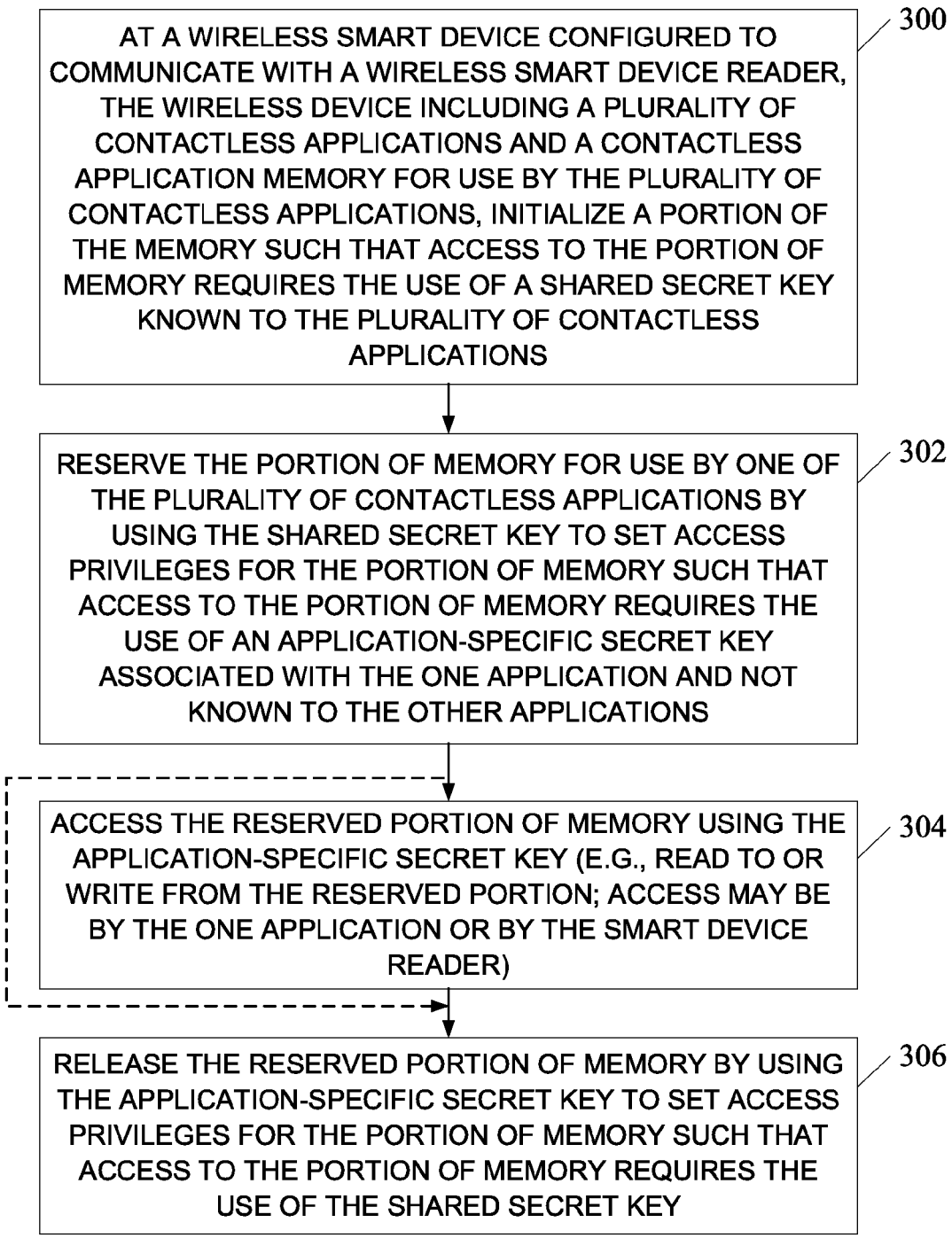
FIG. 3 is a flow chart illustrating an exemplary process for supporting multiple contactless applications using different security keys on the same wireless smart device according to an embodiment of the subject matter described herein.

FIG. 3 is a flow chart illustrating an exemplary process for supporting multiple contactless applications using different security keys on the same wireless smart device according to an embodiment of the subject matter described herein. In one embodiment, wireless smart device 200 is configured to communicate with wireless smart device retailer reader 208, and includes a plurality of contactless applications which share the use of contactless application memory 204.

At block 300, a portion of memory 204 is initialized such that access to the portion of memory requires the use of a shared secret key 216 known to the multiple contactless applications. Initialization of application memory 204 may be performed automatically in response to satisfaction of some predetermined condition, such as detection of a power up, power down, or reset. Initialization may be performed manually, such as in response to a user input. Initialization may be performed in response to a command or message sent from a remote entity, such as a provisioning server on a network. Initialization may be performed by device 200, secure element 202, application memory 204 itself, some other entity within device 200. Similarly, reservation or release of application memory 204 for use by a hosted application may be performed by secure element 202, the application itself, another entity within device 200, or some combination of the above. In one embodiment, user of device 200 may request activation of an application; secure element 202 may detect the request and either perform the reservation steps itself or issue to the application a command instructing the application to perform the reservation steps.

At block 302, the shared secret key 216 is used to reserve the portion of memory 204 for use by one of the contactless applications. For example, access permissions for some or all of memory 204 may be set such that access to the reserved portion of memory 204 requires the use of retailer secret key 218. In one embodiment, the retailer application performs the reservation. In an alternative embodiment, secure element 202 performs the reservation.

At block 304, the reserved portion of memory 204 is accessed using the application-specific secret key. Continuing the example above, the reserved portion of memory 204 must be accessed with retailer secret key 218. It should be noted that the operations performed in block 304 are optional, since it is conceivable that an application may be activated and made ready to perform a function or transaction but not called upon to perform that function or transaction. Similarly, the operations performed in block 304 may be performed multiple times. For example, once the portion of memory 204 is reserved by the retailer application, the retailer application may need to prepare the reserved portion, such as clearing the contents of the memory or loading the memory with the proper contents for the expected transaction. Similarly, whether or not a transaction was also performed, the contents of the reserved portion of memory 204 may be preserved or stored for safekeeping. Finally, the pre- and post-transaction operations, as well as the transactions themselves, may be performed multiple times while the application controls the reserved portion of memory 204.

At block 306, the reserved portion of memory 204 is released so that it may be used by another contactless application, or even by the same application that previously reserved the portion. In one embodiment, the application-specific secret key, such as retailer secret key 218, above, is used to set access permissions for the portion of memory 204 such that subsequent access to that portion requires the use of shared secret key 216.

FIG. 4 is a flow chart illustrating an exemplary process for supporting multiple contactless applications based on MIFARE® specifications using different security keys on the same wireless smart device according to an embodiment of the subject matter described herein. In one embodiment, wireless smart device 200 is configured to communicate with retailer reader 208 and includes secure element 202 for hosting a plurality of MIFARE® applications 212 and 214 which share the use of MIFARE® application memory 204.

At block 400, MIFARE® application memory 204 is initialized such that the sector trailers 106 of one or more of the sectors 102 contain a shared secret key known to the plurality of MIFARE® applications hosted by the secure element, such as shared secret key 216. This initialization may occur as part of a power-on or other reset routine, a reset sequence, or a memory initialization sequence, for example. After initialization, application memory 204 is ready to be accessed or reserved by an application hosted by secure element 202. In one embodiment, shared secret keys 216 may be chosen such that in the initialized state, access to application memory 204 by a reader is blocked. For example, if the shared secret key or key set does not match any application-specific key, no transaction can be performed by retailer reader 208 or theatre reader 210. In this way, shared secret keys 216 may be used to prevent any MIFARE® reader from performing a transaction until a hosted MIFARE® application reserves application memory 204.

At block 402, one or more sectors of MIFARE® memory are reserved for use by one of the multiple MIFARE® applications by using the shared secret key to write information associated with the one application into the MIFARE® memory, including writing a application-specific secret key associated with the one application into a key field of the sector trailer.

The order that the application-specific data may be written into blocks 104 and sector trailers 106 is flexible, so long as a correct access key is used. For example, shared secret key 216 may be used to write the application secret key, such as theatre secret key 222, into a key field, such as key A 108 and key B 110, of sector trailer 106, after which the theatre secret key 222 would be used to write application data, such as ticket MIFARE® data 224, into one or more data blocks 104. Alternatively, shared secret key 216 may be used to write application data, such as MIFARE® ticket data 224, into the sector data blocks 104, after which shared secret key 216 would be used to write the application secret key, such as theatre secret key 222, into sector trailer 106. Upon conclusion of the reservation process, at least one sector trailer 106 will contain one or more application secret keys.

In one embodiment, the reservation of application memory 204 includes copying or moving application data from the application's secure memory area into application memory 204. For example, during reservation of MIFARE® application memory 204 for use by the theatre issuer application, ticket data 224 and theatre secret keys 222 may be copied from SMA2 214 into application memory 204. Once the application memory 204 contains theatre secret keys 222, device 200 is ready for a transaction with theatre reader 210.

At block 404, zero or more transactions of a type supported by the one application may be performed. Continuing the example above, theatre reader 210 will be able to perform a theatre ticket transaction with device 200, but retailer reader 208 will not be able to perform a retail coupon transaction, because the secret keys used by retailer reader 208 do not match the theatre secret keys 222 currently contained in application memory 204.

At block 406, the application memory 204 is released for use by another of the plurality of applications, or for subsequent use by the application that had reserved the memory previously. As in the reservation process, the order that the application-specific data in the blocks 104 and sector trailers 106 is stored into the secure memory area is flexible, so long as a correct access key is used. For example, the application key may be used to store application data from application memory 204 into the secure memory area, followed by using the application key to store the shared secret keys into the sector trailers of application memory 204. Alternatively, the application key may be used to write the shared secret keys to sector trailers of application memory 204, followed by using the shared secret keys to store application data from application memory 204 into the application's secure memory area. Optionally, some or all of application memory 204 may be cleared or written with null or random values as part of the reservation or release processes. At the conclusion of the release process, the sector trailers of application memory 204 should contain shared secret keys 216, so that any application hosted by secure element 202 may reserve application memory 204 for its use.

Figure 5:
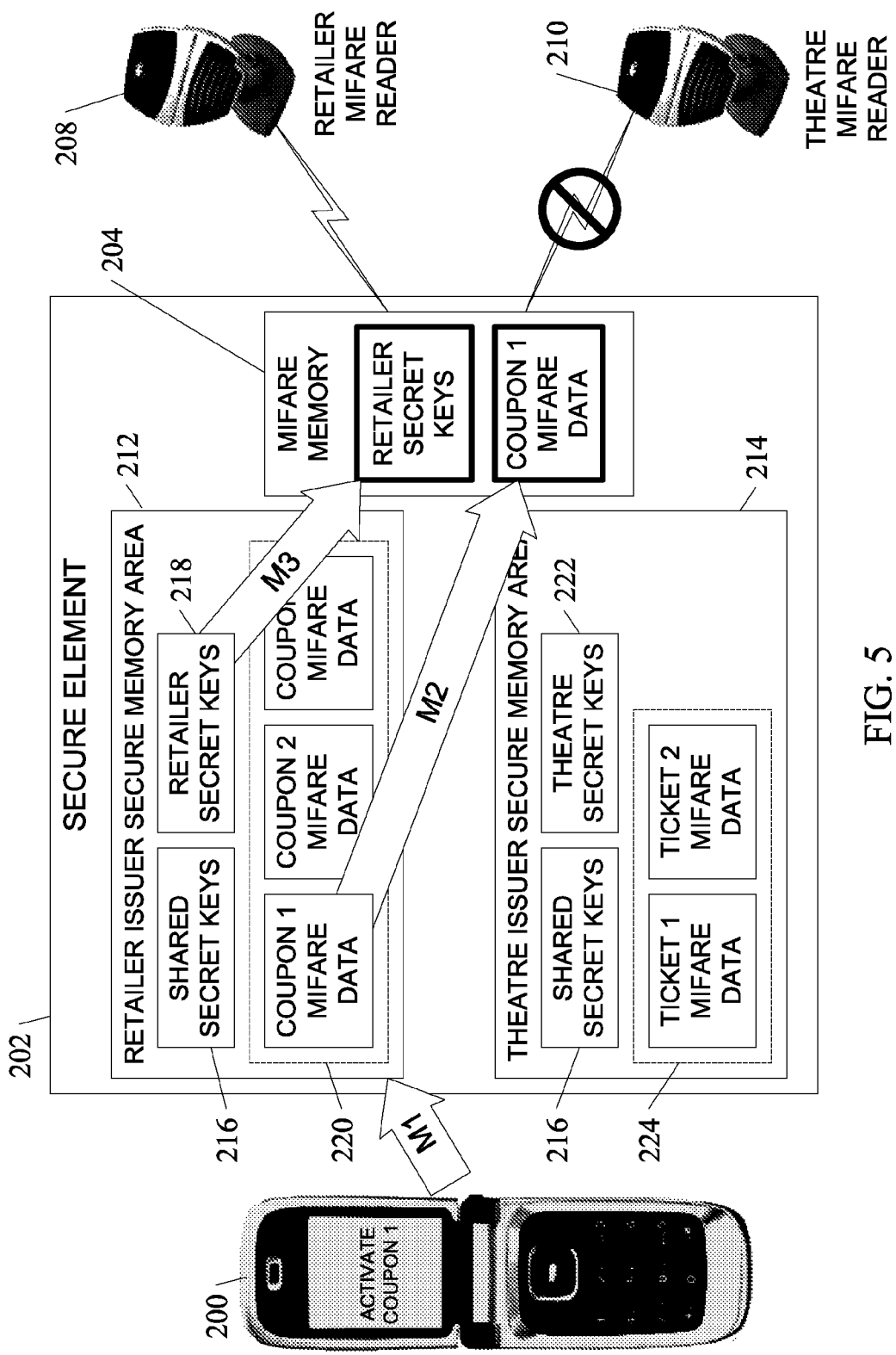
FIG. 5 is a block diagram showing the system of FIG. 2 during execution of an exemplary reservation process according to an embodiment of the subject matter described herein.

FIG. 5 is a block diagram showing the system of FIG. 2 during execution of an exemplary reservation process according to an embodiment of the subject matter described herein. In one embodiment, the user of device 200 may initiate or request activation of coupon 1 of a retailer MIFARE® application (FIG. 5, message M1). If, at the time of the request, no application is active, MIFARE®—compatible application memory 204 will contain the shared secret keys 216, in which case shared secret keys 216 may be used to write coupon data 220 (FIG. 5, message M2) followed by retailer secret keys 218 into application memory 204 (FIG. 5, message M3). Alternatively, shared secret keys 216 may be used to write retailer secret keys 218 into application memory 204, and then retailer secret keys 218 may be used to write coupon data 220 into application memory 204. If, at the time of the request, the retailer application is already active, application memory 204 will already contain retailer secret keys 218, in which case retailer secret keys 218 may be used to write coupon data 220 to application memory 204. In one embodiment, coupon data 220 or retailer secret keys 218 may be copied from the retailer application's secure memory area SMA1 212 into application memory 204.

Upon completion of the reservation process, a retailer MIFARE® reader 500 will be able to perform a transaction with device 200, while theatre MIFARE® reader 502, which does not know the values of retailer secret keys 218, will not be able to perform a transaction with device 200.

As described above with respect to FIG. 4, block 402, the order in which coupon data 220 and retailer secret keys 218 are written into application memory 204 (FIG. 5, messages M2 and M3, respectively) is largely irrelevant, bearing in mind that whatever key is currently in the sector trailer must be used during the write. However, once retailer secret keys 218 are written into the sector trailers, subsequent accesses, including writing to data sectors, must be performed using retailer secret keys 218 rather than shared secret keys 216. In addition, absent other prohibitions imposed by secure element 202, once retailer secret keys 218 are written into the sector trailers, retailer reader 208 may initiate a transaction.

Figure 6:
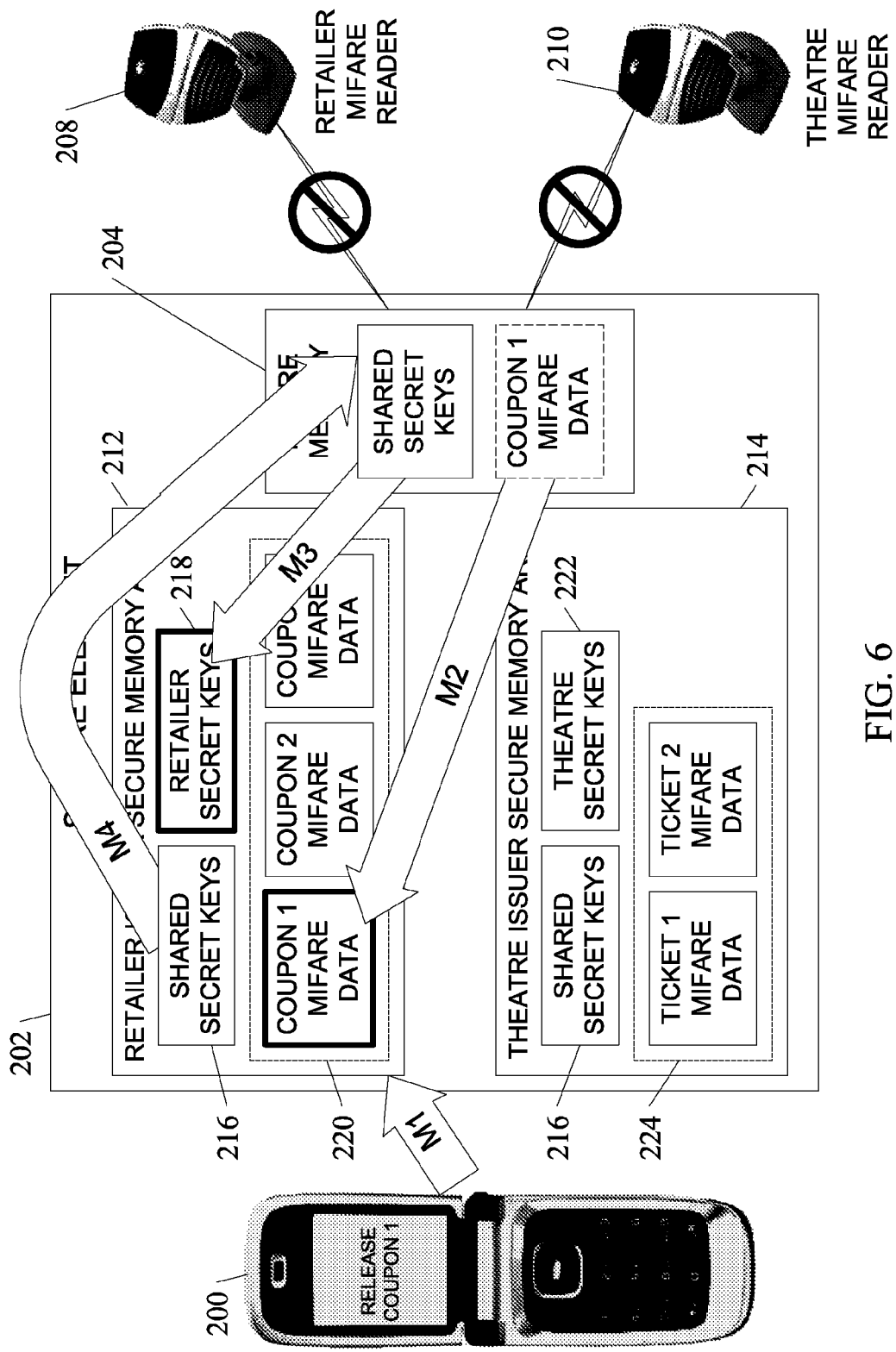
FIG. 6 is a block diagram showing the system of FIG. 2 during execution of an exemplary release process according to an embodiment of the subject matter described herein.

FIG. 6 is a block diagram showing the system of FIG. 2 during execution of an exemplary release process according to an embodiment of the subject matter described herein. In one embodiment, the user of device 200 may initiate or request the release of coupon 1 of the retailer MIFARE® application (FIG. 6, message M1). In response to the request for release, coupon data 220 and/or retailer secret keys 218 may be copied from application memory 204 into the retailer's secure memory area SMA1 212 for safekeeping (FIG. 6, messages M2 and M3, respectively). Optionally, the application memory 204 may be prepared for use by a subsequent application. The contents of application memory 204 may simply be cleared, such as by filling data sectors with all zeroes or all ones, for example, or the contents may be obliterated, such as by filling with random data. Upon completion of storage of the theatre application data from application memory 204 into SMA1 212 and/or preparation of application memory 204 for subsequent use, application memory 204 may be put into the locked or initialization state, such as by writing shared secret keys 216 into the sector trailers of application memory 204 (FIG. 6, message M4). In this state, neither retailer reader 208 nor theatre reader 210 may access application memory 204.

Figure 7:
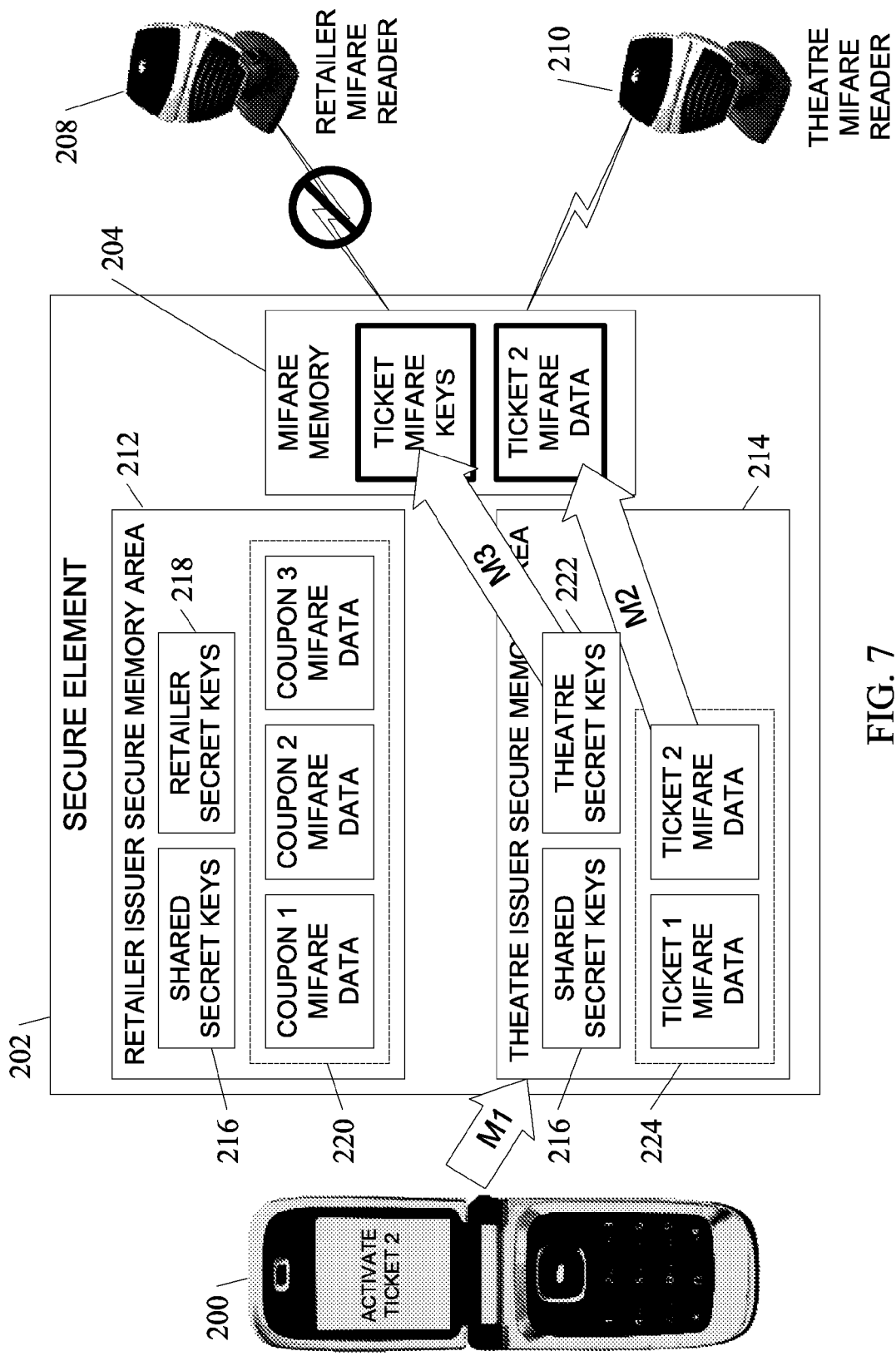
FIG. 7 is a block diagram showing the system of FIG. 2 during execution of another exemplary reservation process according to an embodiment of the subject matter described herein.

FIG. 7 is a block diagram showing the system of FIG. 2 during execution of another exemplary reservation process according to an embodiment of the subject matter described herein. In one embodiment, the user of device 200 may request activation of ticket 2 of a theatre MIFARE® application (FIG. 7, message M1). In response to the request, ticket data 224 and theatre secret keys 222 may be written to application memory 204 (FIG. 7, messages M2 and M3, respectively). Upon completion of this reservation process, theatre reader 210 will be able to perform a transaction with device 200 but retailer reader 208 will not.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for supporting multiple contactless applications using different security keys on a wireless smart device, the method comprising:

at a wireless smart device configured to communicate with a wireless smart device reader, the wireless device including a plurality of contactless applications and a contactless application memory for use by the plurality of contactless applications:

initializing a portion of the memory such that access to the portion of memory requires the use of a shared secret key known to the plurality of contactless applications;

reserving the portion of memory for use by one of the plurality of contactless applications by using the shared secret key to set access privileges for the portion of memory such that access to the portion of memory requires the use of a application-specific secret key associated with the one application and not known to the other applications;

accessing the reserved portion of memory using the application-specific secret key; and releasing the reserved portion of memory by using the application-specific secret key to set access privileges for the portion of memory such that access to the portion of memory requires the use of the shared secret key.

2. The method of claim 1 wherein initializing the portion of memory includes initializing the portion of memory during at least one of a power on reset, a power on sequence, a system reset, and a memory initialization procedure.

3. The method of claim 1 wherein accessing the reserved portion of memory using the application-specific secret key includes at least one of reading from the portion and writing to the portion by at least one of the one application and the smart device reader.

4. The method of claim 1 wherein the application memory comprises a MIFARE memory, the memory including at least one sector, each sector including a sector trailer including a key field for holding an access key for the respective sector.

5. The method of claim 4 wherein the portion of memory comprises a sector of the MIFARE memory and wherein setting access privileges for the portion of memory such that access to the portion of memory requires a secret key includes writing the secret key into the key field of the sector trailer.

6. A method for supporting multiple contactless applications based on MIFARE specifications using different security keys on a wireless smart device, the method comprising:

at a wireless smart device configured to communicate with a wireless smart device reader, the device including a secure element for hosting a plurality of contactless applications based on MIFARE specifications and a MIFARE memory for use by the plurality of contactless applications based on MIFARE specifications:

initializing a sector of the MIFARE memory such that a sector trailer of the sector contains a shared secret key known to the plurality of contactless applications based on MIFARE specifications hosted by the secure element;

reserving the sector of MIFARE memory for use by one of the plurality of contactless applications based on MIFARE specifications by using the shared secret key to write information associated with the one application into the MIFARE memory, including writing a application-specific secret key associated with the one application into a key field of the sector trailer;

performing a MIFARE transaction with the wireless smart device reader, the MIFARE transaction including accessing, by the wireless smart device reader, the reserved sector of MIFARE memory using the application-specific secret key contained in the key field of the sector trailer; and releasing the sector of MIFARE memory for use by another of the plurality of contactless applications based on MIFARE specifications by using the application-specific secret key associated with the one application to write the shared secret key into a key field of the sector trailer.

7. The method of claim 6 wherein reserving the sector of MIFARE memory for use by the one application includes using at least one of the shared secret key and the application-specific secret key to copy the information associated with the one application from a secure data storage area associated with the one application into the sector of MIFARE memory.

8. The method of claim 6 wherein releasing the MIFARE memory includes using at least one of the shared secret key and the application-specific secret key to copy information associated with the one application from the MIFARE memory into the secure data storage area associated with the one application.

9. The method of claim 6 wherein releasing the MIFARE memory includes using at least one of the shared secret key and the application-specific secret key to write null data into a sector data block of the sector of MIFARE memory.

10. A wireless smart device for supporting multiple applications using different security keys, the wireless smart device comprising:

a communications module for wirelessly communicating with a wireless smart device reader;

a plurality of applications for communicating with the wireless smart device reader via the communications module, each application having associated with it an application key not known to the other applications; and an application memory for use by the plurality of applications and accessible by the wireless smart device reader via the communications module, wherein access to at least a portion of the memory requires the use of an access key, the application memory being configured such that, upon initialization, a shared secret key, known to the plurality of applications, is the access key for the portion of memory, wherein each one application is configured to reserve the portion of memory by using the shared secret key to change the access key for the portion to the application key associated with the one application, and wherein each one application is configured to release the reserved portion of memory by using the application key associated with the one application to change the access key for the portion to shared secret key.

11. The system of claim 10 wherein each one application has a secure memory area, separate from the application memory, for storing data associated with that one application.

12. The system of claim 10 comprising a secure element for hosting applications, wherein the plurality of applications are hosted by the secure element.

13. The system of claim 12 wherein the secure element is configured to reserve the portion of memory by using the shared secret key to change the access key for the portion to the application key associated with the one application, and wherein the secure element is configured to release the reserved portion of memory by using the application key associated with the one application to change the access key for the portion to shared secret key.

14. The system of claim 10 wherein the application memory comprises a MIFARE memory, the memory comprising at least one MIFARE sector, each MIFARE sector including a sector trailer, and each sector trailer including a key field for containing the access key, and wherein the communications module is configured to communicate with the wireless smart device reader to perform a MIFARE transaction.

15. The system of claim 14 wherein the MIFARE memory is configured such that upon initialization, the key field of at least one sector trailer contains the shared secret key.

16. The system of claim 15 wherein initialization includes at least one of a power on reset, a power on sequence, a system reset, and a memory initialization procedure.

17. A computer readable medium encoded with computer executable instructions for performing steps comprising:

at a wireless smart device configured to communicate with a wireless smart device reader, the device including a secure element for hosting a plurality of applications and an application memory for use by the plurality of applications:

initialize at least a portion of the memory such that access to the portion of memory requires the use of a shared secret key known to the plurality of hosted applications;

using the shared secret key, set access privileges for the portion of memory such that access to the portion of memory requires the use of a application-specific secret key known to one of the plurality of hosted applications;

using the application-specific secret key, access the portion of memory; and releasing the reserved portion of memory by using the application-specific secret key to set access privileges for the portion of memory such that access to the portion of memory requires the use of the shared secret key.

18. A computer readable medium encoded with computer executable instructions for performing steps comprising:

at a wireless smart device configured to communicate with a wireless smart device reader, the device including a secure element for hosting a plurality of contactless applications based on MIFARE specifications and a MIFARE memory for use by the plurality of contactless applications based on MIFARE specifications:

initializing a sector of the MIFARE memory such that a sector trailer of the sector contains a shared secret key known to the plurality of contactless applications based on MIFARE specifications hosted by the secure element;

reserving the sector of MIFARE memory for use by one of the plurality of contactless applications based on MIFARE specifications by using the shared secret key to write information associated with the one application into the MIFARE memory, including writing a application-specific secret key associated with the one application into a key field of the sector trailer;

performing a MIFARE transaction with the wireless smart device reader, the MIFARE transaction including, by the wireless smart device reader, accessing the reserved sector of MIFARE memory using the application-specific secret key contained in the key field of the sector trailer; and releasing the sector of MIFARE memory for use by another of the plurality of contactless applications based on MIFARE specifications by using the application-specific secret key associated with the one application to write the shared secret key into a key field of the sector trailer.

* * * * *